Dec. 14, 1948.                    M. H. ABRAMSON                    2,456,039
                                  SECURING DEVICE
                                Filed Sept. 27, 1945
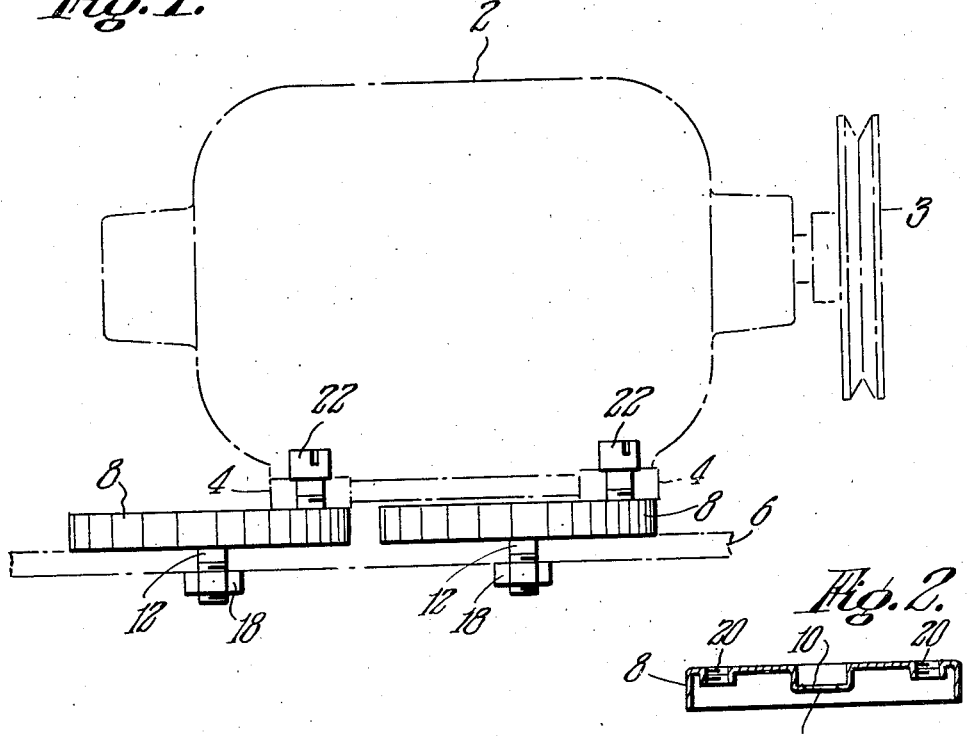
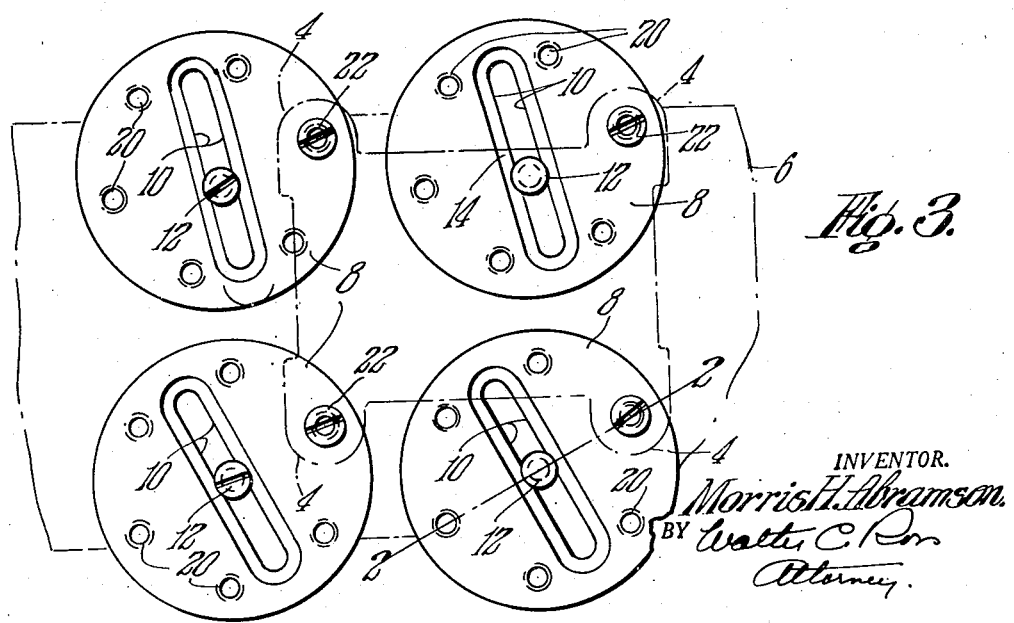
INVENTOR.
Morris H. Abramson.
BY Walter C. Ron
   Attorney.

Patented Dec. 14, 1948

2,456,039

UNITED STATES PATENT OFFICE 2,456,039

SECURING DEVICE

Morris H. Abramson, Springfield, Mass.

Application September 27, 1945, Serial No. 618,936

3 Claims. (Cl. 248—23)

This invention relates to improvements in securing devices and is directed more particularly to devices for securing motors to supports and the like.

The principal objects of the invention are directed to the provision of a novel device adapted and arranged for securing a motor to a support.

In various types of equipment as for instance, an electric refrigerator, it is often necessary to replace the motor thereof which is secured to a support.

A new motor is not likely to have the same arrangement of bolt holes as the one being replaced so that drilling of new holes in the support therefor is necessary and is often very difficult due to the location of the support.

According to this invention, a securing device is provided which is adapted for securement to a support in such a way as to accommodate a motor thereby obviating the necessity of drilling holes while at the same time the motor may be more easily located in order to line up with the unit to be driven thereby.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawings wherein:

Figs. 1 and 2 are side elevational and plan views showing a motor and support in dot-dash lines secured together by the device of the invention; and Fig. 3 is a sectional elevational view on the line 3—3 of Fig. 2.

Referring now to the drawings more in detail, the invention will be fully described.

A motor is shown at 2 which has feet 4 that are provided with holes for bolts or screws.

A support is shown by dot-dash lines 6 and the device of the invention is represented by 8. The support 6 will have holes for bolts or screws which for purposes of description will be assumed to be not registrable with the holes of the motor feet.

The securing device 8 is preferably in the shape of a disc which may be formed from sheet metal by a stamping or pressing operation.

There is a transverse slot 10 provided in the device 8 for receiving a bolt or screw 12 which has a ledge 14 for the head of a bolt or screw.

To secure a motor to a support a plurality of devices 8 are disposed on the support 6 with bolts or screws 12 extending through the slots 10 and through the holes in said support. In the form of the invention shown, nuts 18 are in engagement with the screws 12.

A plurality of tapped holes 20 are provided in the members 8 for receiving bolts or screws 22 which are to extend through the holes in the motor feet 4.

With the members 8 on the support and the screws 12 provided for clamping purposes, the motor feet are disposed over certain tapped holes of the members 8.

The members 8 may be moved back and forth in various directions relative to the screws 12 and may also be rotated. This makes it possible to shift the motor transversely and longitudinally to bring the pulley 3 thereof into the desired relation with respect to the unit to which it is connected.

By means of the invention, it is possible to secure a motor to a support where the drilling of the motor feet is different than the drilling of the support thereby to obviate drilling operations while at the same time the motor may be shifted so as to be located as desired without regard to the arrangement of the drilling in the support.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. Means for securing a motor having separated bolt holes to a base having separated bolt holes spaced differently from those of the motor comprising, a plurality of circular plate members adapted to underlie a motor each having circumferentially spaced bolt holes adjacent marginal edges thereof for receiving bolts extending through the bolt holes of the motor, said members having elongated depressions in their upper faces terminating inwardly from opposite sides thereof and slots extending longitudinally of the depressions for receiving bolts extending upwardly from the holes of the base, the slots being of less width than the depressions forming ledges at the sides thereof for the heads of the support bolts disposed below the upper faces of said members whereby bolts in the base may underlie the motor.

2. A device for connecting a motor having spaced bolt holes to a support having bolt holes comprising, a circular plate member provided with circumferentially spaced bolt holes adjacent its periphery and a central bolt depression and slot, the depression being disposed in the upper side of said plate member terminating at its opposite ends inwardly of and adjacent opposite side edges of said plate member and having an upper face disposed in a plane below that of the upper face of said plate member, the slot extending along and being of less length and width than the depression whereby the upper face thereof at the sides and ends of the slot provides ledges for the head of a bolt extending through the slot.

3. A device for connecting a motor having spaced bolt holes to a support having bolt holes, comprising, a plate member provided with a spaced bolt slot adjacent its periphery and a bolt depression and hole, the depression being disposed in the upper side of said plate member and terminating inwardly of and adjacent opposite side edges of said plate member and having an upper face disposed in a plane below that of the upper face of said plate member, the hole extending through and being of less diameter than the width of the depression whereby the upper face of the depression at the sides of the hole provides ledges for the head of a bolt extending through the hole to the hole of the support, and the slot extending longitudinally of and through said plate member for receiving a bolt extending through the slot to a bolt hole of the motor.

MORRIS H. ABRAMSON.

REFERENCES CITED

The following references are of record in the file of this patent:

UNITED STATES PATENTS

| Number | Name | Date |
| --- | --- | --- |
| 1,227,292 | Mills | May 22, 1917 |